(12) United States Patent
Liao et al.

(10) Patent No.: US 8,605,558 B2
(45) Date of Patent: Dec. 10, 2013

(54) OPTICAL PICKUP ASSEMBLIES AND DRIVE SYSTEMS WITH THE SAME

(75) Inventors: Wei Hsin Liao, Ma On Shan (HK); Kwong Wah Chan, Tsuen Wan (HK)

(73) Assignee: The Chinese University of Hong Kong, Hong Kong (CN)

( * ) Notice: Subject to any disclaimer, the term of this patent is extended or adjusted under 35 U.S.C. 154(b) by 490 days.

(21) Appl. No.: 12/822,483

(22) Filed: Jun. 24, 2010

(65) Prior Publication Data

US 2011/0317538 A1    Dec. 29, 2011

(51) Int. Cl.
*G11B 7/12* (2012.01)

(52) U.S. Cl.
USPC .............. 369/53.28; 369/44.21; 720/681; 720/684; 720/687; 720/688

(58) Field of Classification Search
USPC ........ 369/112.23, 53.23, 53.28, 44.17, 44.19, 369/44.21, 112.01, 247.1, 248; 720/605, 720/662, 681, 684, 687–688
See application file for complete search history.

(56) References Cited

U.S. PATENT DOCUMENTS

| | | | |
|---|---|---|---|
| 5,189,578 A * | 2/1993 | Mori et al. | 360/294.6 |
| 6,175,546 B1 * | 1/2001 | Liou | 720/687 |
| 2003/0074783 A1 * | 4/2003 | Boismier et al. | 29/603.03 |
| 2006/0013109 A1 * | 1/2006 | Fujiwara et al. | 369/112.01 |
| 2006/0164954 A1 * | 7/2006 | Hashimura | 369/112.01 |
| 2006/0198279 A1 * | 9/2006 | Kurogama et al. | 369/112.24 |
| 2008/0094758 A1 * | 4/2008 | Liao et al. | 360/294.4 |
| 2008/0112279 A1 * | 5/2008 | Nakagaki | 369/44.14 |
| 2008/0253269 A1 * | 10/2008 | Koga et al. | 369/126 |
| 2008/0310287 A1 * | 12/2008 | Aoki et al. | 369/112.29 |
| 2009/0001852 A1 * | 1/2009 | Ashizawa | 310/323.16 |

* cited by examiner

*Primary Examiner* — Thomas Alunkal
(74) *Attorney, Agent, or Firm* — Seed IP Law Group PLLC

(57) ABSTRACT

Disclosed are a pickup device assembly and an optical drive system. The assembly may comprise: a laser generator for generating laser beams; an objective lens; and at least one piezoelectric actuator for generating bending moments once applied with voltages, wherein the generated bending moments move the objective lens such that the laser beams are focused by the objective lens and then aim at concentric spiral data tracks of a disc with a strongest reflected signal of the laser beams from the disc.

24 Claims, 8 Drawing Sheets

FIG. 5 (Exploded View)

OPTICAL PICKUP ASSEMBLIES AND DRIVE SYSTEMS WITH THE SAME

TECHNICAL FIELD

The disclosure herein relates to an optical pickup assembly and an optical drive system with the same.

BACKGROUND

High definition (HD) videos and HDTV broadcasting become more popular in the entertainment industry. The HD videos and HDTV contents are generally recorded in an optical disc. The conventional optical drive for writing and playing back the HD videos and HDTV generally comprises a house, a disc/spindle assembly, an optical pickup assembly and a plurality of control circuits, in which the optical pickup assembly is a "heart" of the optical drive and is used for reading from and writing data into the optical disc.

The optical pickup assembly mainly comprises a laser generator (i.e. laser diode), a half-reflecting prism, an objective lens and a plurality of photodiodes. When reading the data from the optical disc, the laser generator generates and emits laser beams. The generated laser beams run through the half-reflecting prism and are converged into the objective lens, which in turn focuses the converged laser beams into small optical spots and sends the optical spots to the disc. Reflecting materials on the disc will reflect the optical spots. The reflected optical spots are transmitted through the objective lens and then reach the photodiodes via the half-reflecting prism. Since there are some pits in a surface of the disc to record the data, the laser beams are reflected from the surface of the disc in various directions. Signals of the laser beams in various directions may be represented as "0" or "1". The photodiodes decode the data of "0" or "1" in a desirable format for playing back.

In the optical disc, data are recorded in concentric spiral tracks. When reading the data from the concentric spiral tracks, the error correction capability and reliability of the optical pickup assembly will directly depend on two motions of "tracking" and "focusing". The "tracking" is to keep the laser beams aiming at the concentric spiral tracks. The called "focusing" is to accurately transmit the laser beams to the disc with the strongest reflected signal from the disc. The objective lens may be moved in a vertical direction to provide the motion of "focusing", and moved in a horizontal direction to provide the motion of "tracking". In order to maintain the "tracking" and "focusing" motions, a continuous adjustment of the lens-disc separation and of a radial position on the track are performed when reading and writing.

Currently large capacity optical disc formats such as Blu-ray and HD-DVD have been proposed. Accordingly, the optical drive is needed to be improved so as to quickly and precisely position optical detecting spots in tracking and focusing motions in optical pickup assembly.

SUMMARY

In a first aspect, there is provided a pickup device assembly comprising:
a laser generator for generating laser beams;
an objective lens; and
at least one piezoelectric actuator for generating bending moments once applied with voltages,
wherein the generated bending moments move the objective lens such that the laser beams are focused by the objective lens and then aim at concentric spiral data tracks of a disc with a strongest reflected signal of the laser beams from the disc.

According to one embodiment, two piezoelectric actuators generates bending moments once applied with voltages to move the objective lens in a horizontal direction such that the laser beams are focused by the objective lens and then aim at concentric spiral data tracks of a disc; and to move the objective lens in a vertical direction such that the laser beams are accurately transmitted through the lens to the disc with a strongest reflected signal of the laser beams from the disc.

Each of the two piezoelectric actuators may comprise a piezoelectric layer; and a shim arranged on one side of the piezoelectric layer. Alternatively, each of the two piezoelectric actuators is a piezoelectric bimorph actuator with two piezoelectric layers, and a shim is sandwiched between the two piezoelectric layers. There is provided a damping layer on one side of each actuator, and a constraining layer on one side of the damping layer. In another implementation, at least one segment of damping layer and the at least one segment of force transmission layer may be alternately sandwiched between the two piezoelectric layers.

In one embodiment, a lever beam is arranged between the two piezoelectric actuators to support the objective lens.

In a second aspect, there is provided a pickup system comprising:
a laser generator for generating laser beams;
an objective lens; and
at least one first actuator once applied with voltages to move the objective lens in a horizontal direction so as to implement a primary tracking motion;
at least one second actuator for generating bending moments once applied with voltages to move the objective lens in a horizontal direction so as to implement a second tracking motion, wherein the first tracking motion co-acts with the secondary tracking motion such that the laser beams are focused by the objective lens and then aim at concentric spiral data tracks of a disc; and
wherein the bending moments from the second actuator further make the objective lens to move in a vertical direction such that the laser beams are accurately transmitted through the lens to the disc with a strongest reflected signal of the laser beams from the disc. The movement amount of the objective lens caused by the first actuator may be more than that caused by the second actuator.

In a third aspect, there is provided a pickup unit, comprising: two piezoelectric actuators; a lever beam arranged between the two piezoelectric actuators; an objective lens arranged on the lever beam; wherein there is provided with a damping layer on one side of each of the piezoelectric actuators, and there is provided with a constraining layer on one side of the damping layer.

In a fourth aspect, there is provided a pickup unit, comprising: two piezoelectric actuators; a lever beam arranged between the two piezoelectric actuators; an objective lens arranged on the lever beam; wherein each of the two piezoelectric actuators comprises two piezoelectric layers, and wherein at least one segment of damping layer and at least one segment of force transmission layer are alternately sandwiched between the two piezoelectric layers.

BRIEF DESCRIPTION OF DRAWINGS

FIG. 5 is an exploded view of a piezo-based optical pickup device as shown in FIGS. 4A and 4B.

DETAILED DESCRIPTION

Hereinafter, the exemplified embodiments in the application will be discussed in reference to the accompanying drawings.

Figure 1:
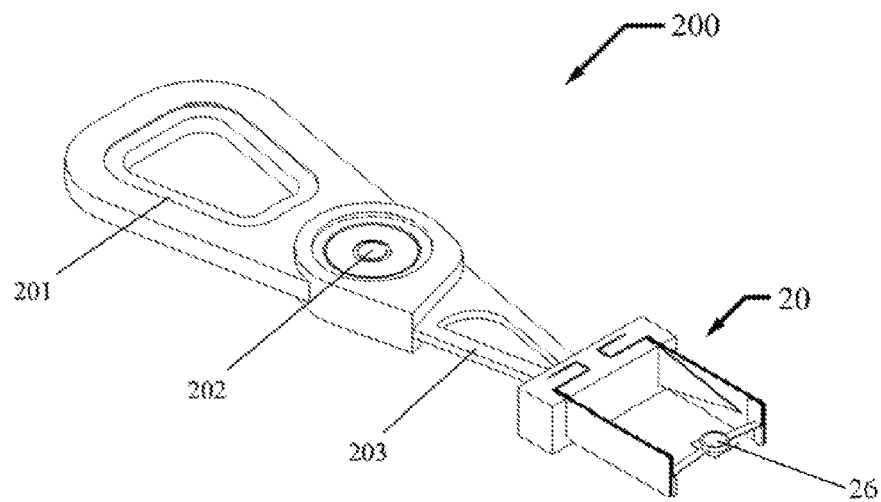
FIG. 1 illustrates a perspective view of a piezo-based optical pickup system according to one embodiment of the application.
Figure 3:
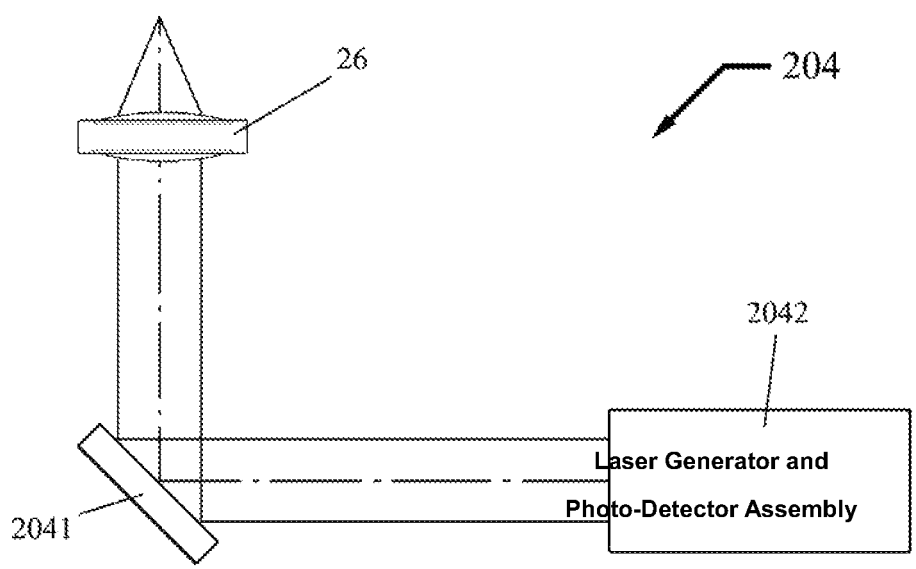
FIG. 3 illustrates an optical pickup system according to one embodiment of the application.

FIG. 1 illustrates a perspective view of a piezo-based optical pickup system 200 according to one embodiment of the application. The system 200 comprises an arm body 203, which may has an acute triangular shape as shown in FIG. 1. In a substantive center of the arm body 203, the arm body 203 is pivotally connected with a pivot bearing 202. A pickup device assembly 20 is arranged on one side of the arm body 203 and is provided with an optical pickup system 204. For example, the optical pickup system 204 may include an objective lens 26, a half-reflecting prism 2041 and a laser generator and photo-detector assembly 2042, as shown in FIG. 3. For purpose of clarity, the laser generator and photo-detector assembly 2042 and half-reflecting mirror prism 2041 are omitted in FIG. 1.

There is provided a hollow hole on the side of the arm body 203 that is adjacent to the bottom of the triangular shape. Arranged around the internal sides of the hole is a voice coil motor (VCM) 201. One or more permanent magnets (not shown) are arranged above or under the VCM 201. When applied with voltages, the VCM 201 generates a magnetic field. The magnetic field co-acts with the magnetic field generated by the permanent magnets so as to enable the arm body 203 to rotate around the pivot bearing 202, which in turn makes the objective lens 26 arranged on the pickup device assembly 20 to move in a horizontal direction.

In this implementation, VCM 201 severs as a first actuator to make the objective lens 26 to move considerably in the horizontal direction so as to carry out a first stage and coarse "tracking" motion; while a second stage and fine "tracking" motion will be carried out in the pickup device assembly 20, which will discussed below in reference to FIGS. 4 and 5. The first stage and coarse "tracking" motion and the second stage and fine "tracking" motion cooperate and form a dual-stage servo system for track seeking.

Figure 2:
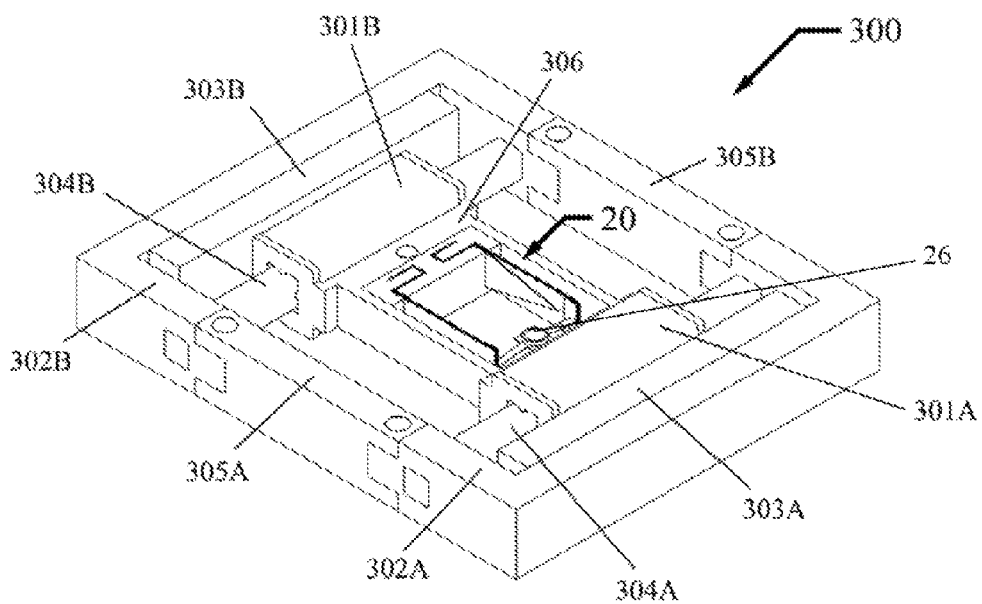
FIG. 2 illustrates a perspective view of a piezo-based optical pickup system according to another embodiment of the application.

FIG. 2 illustrates a perspective view of a piezo-based optical pickup system 300 according to another embodiment of the application. The system 300 comprises two yokes 302A and 302B, which are opposite to each other, and a pair of magnetic flux insulators 305A and 305B. The two yokes 302A and 302B, and insulators 305A and 305B form a structure of rectangular frame. The yokes 302A and 302B may be made of magnetic conduction materials such as pure iron or silicon steel, and the insulators 305A and 305B may be made of non-magnetic conduction materials such as aluminum.

Two magnets 303A and 303B are arranged in the internal sides of the two yokes 302A and 302B, respectively. There are provided a pair of guiding rods 304A and 304B between the insulators 305A and 305B. The guiding rods 304A and 304B are separated from each other and extend along the extending direction of the magnets 302A and 302B. The guiding rods 304A and 304B may be made of magnetism-conductive materials. A VCM 301A is housed on the guiding rod 304A and a VCM 301B is housed on the guiding rod 304B. A pickup device assembly 20 is arranged between the VCM 301A and the VCM 301B. The pickup device assembly 20 may include an optical pickup system 204 as shown in FIG. 3. Again, the members 2041 and 2042 are omitted in FIG. 2 for purpose of clarity.

When applied with voltages, each of the VCM 301A and the VCM 301B generates a magnetic field. The generated magnetic field co-acts with the magnetic field generated by the magnets 303A and 303B so as to move the pickup device assembly 20 in a horizontal direction, which in turn move the objective lens 26 thereon accordingly. In this implementation, VCMs 301A and 301B make the objective lens 26 to move considerably in the horizontal direction so as to carry out a first stage and coarse "tracking" motion; while the pickup device assembly 20 will carry out a second stage and fine "tracking" motion, which will discussed below in reference to FIGS. 4 and 5. The first stage and coarse "tracking" motion and the second stage and fine "tracking" motion cooperate and form a dual-stage servo system for track seeking.

Hereinafter, the pickup device assembly 20 according to the embodiments of the application will be discussed in reference to the accompanying drawings.

In general, the pickup device assembly 20 may carry out the secondary stage and fine "tracking" motion by moving the objective lens 26 therein in a horizontal direction, and the "focusing" motion by moving the objective lens 26 therein in a vertical direction. In the pickup device assembly 20, there are provided two oppositely arranged piezoelectric actuators, such as bimorph actuators, between which the objective lens 26 is arranged. Take the piezoelectric bimorph actuators as an example, when applied with voltages, one piezoelectric layer of the each bimorph actuator extends and the other piezoelectric layer thereof contracts, and thus the piezoelectric bimorph actuator deforms, which in turn makes the objective lens 26 to move in a horizontal and radial direction such that the laser beams from the laser generator may be aimed at the concentric spiral tracks of the disc (i.e. the secondary stage "tracking" motion), and to move in a vertical direction such that the laser beams may be accurately transmitted to the disc with the strongest reflected signal from the disc (i.e. "focusing" motion).

In particular, a lever beam may be supported between the two bimorph actuators, and the objective lens may be arranged on the lever beam. Once applied with voltages, the bimorph actuators deform, and then generate forces and bending moments to move the lever beam in horizontal direction or vertical direction. The horizontal or vertical movements of the lever beam make the objective lens to move accordingly so as to complete the "tracking" or "focusing" motion.

The more details for the pickup device assembly 20 will be discussed in reference to FIGS. 4-12.

Figure 4A:
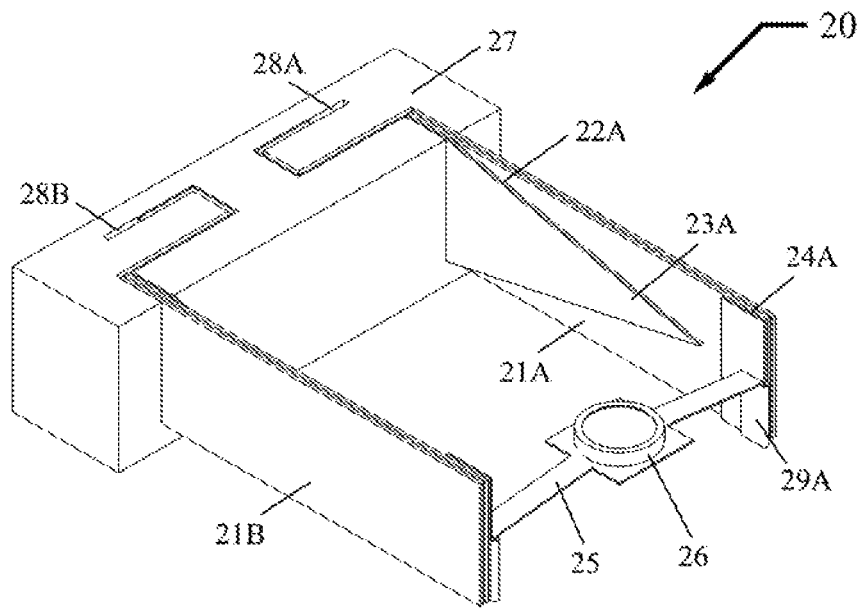
FIGS. 4A and 4B are perspective views illustrating in two sides a piezo-based optical pickup device according to one embodiment of the application.
Figure 4B:
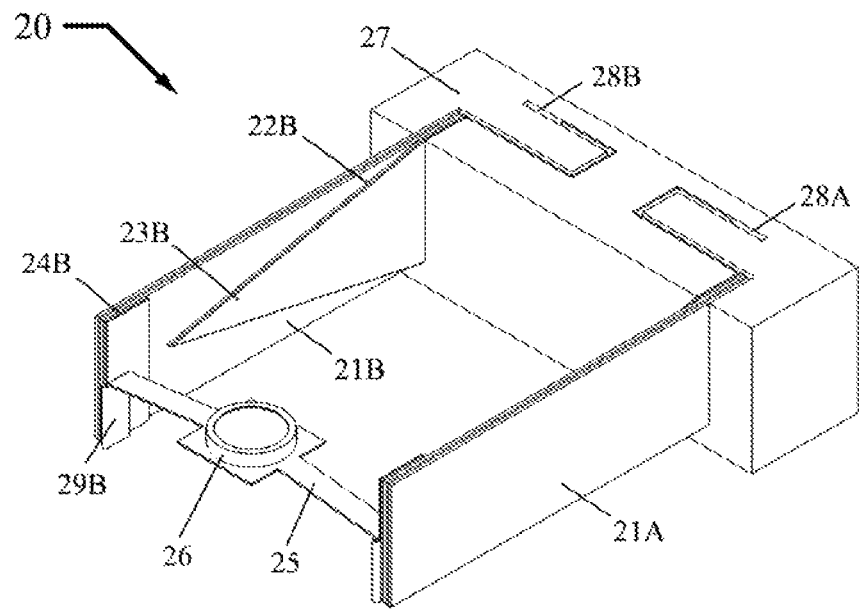

FIGS. 4A and 4B are perspective views illustrating in two sides a piezo-based optical pickup device 20 according to one embodiment of the application. FIG. 5 is an exploded view of a piezo-based optical pickup device as shown in FIGS. 4A and 4B. As shown, the optical pickup device 20 comprises a housing 27 on which there are arranged piezoelectric actuators 21A and 21B, damping layers 22A and 22B, and constraining layers 23A and 23B. Each of the actuators 21A and 21B comprises two piezoelectric layers, between which a shim is sandwiched. The shim may be formed of metal materials, such as brass or stainless steel, or composite materials. The damping layers 23A and 23B may be formed of viscoelastic materials and the constraining layers 22A and 22B may be formed of metal materials. It should be appreciated that the number of piezoelectric layers shall be less or more than two although the above are discussed in reference to the actuators 21A and 21B comprising two piezoelectric layers. In the case that each of actuators 21A and 21B is made of single piezoelectric layer, the shim may be arranged on one side of the single piezoelectric layer. Hereinafter, the discussion will be made in reference to the actuators 21A and 21B comprising two piezoelectric layers (also referred to "bimorph actuators").

The housing 27 may have a cuboid body with configurations for holding the bimorph actuators 21A and 21B, the damping layers 22A and 22B, and the constraining layers 23A and 23B. In one example, the configurations may be two holding slots 28A and 28B symmetrically formed in the house. As shown in FIGS. 4 and 5, the bimorph actuators may be shaped as rectangular sheets, and the damping layers and constraining layers may be shaped as triangular sheets, respectively. One end of each of the bimorph actuators 21A and 21B, damping layers 23A and 23B, and constraining layers 22A and 22B is inserted into the slots.

As shown, a lever beam 25 is held between the two bimorph actuators 21A and 21B. According to one embodiment, the lever beam 25 may be held in the middle of the front ends of the bimorph actuators 21A and 21B. The lever beam 25 may be attached to each bimorph actuator 21A and 21B by an epoxy 24A and an epoxy 24B. It should be understood that the lever beam 25 may be attached or fixed to each bimorph actuator 21A and 21B by other available means. The lever beam 25 may be made of brass or stainless steel, which materials may be different from that of the constraining layers 23A and 23B. The materials of the lever beam 25 may be selected depending on the required stroke for the "focusing" motion. The objective lens 26 is substantively arranged in the center of the lever beam 25. As shown in FIG. 5, an epoxy 30A and an epoxy 30B are used to connect the lever beam 25 to the lever bases 29A and 29B.

The bimorph actuators 21A and 21B have not only high resolution and bandwidth but also light weight and low power consumption compared with voice coil motors. When applied with voltages, the bimorph actuators 21A and 21B operate to generate forces and bending moments to move the lever beam 25 in a horizontal direction, which in turn moves the objective lens 26 thereon accordingly so as to carry out the secondary "tracking" motion, and to contract or extend the lever beam 25 to lift the objective lens upwards and downwards so as to carry out the "focusing" motion.

Figure 6:
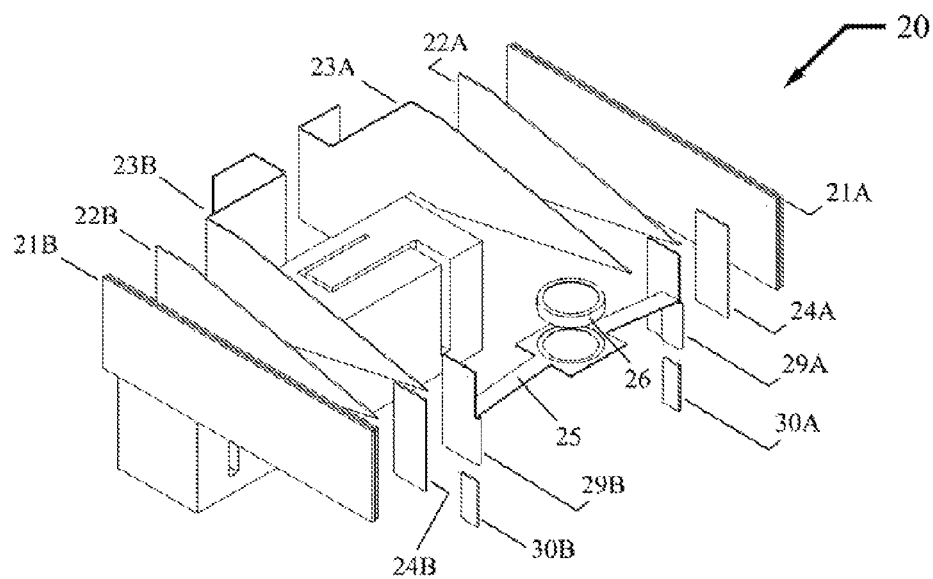
FIGS. 6A and 6B illustrate the movement relationship between the bimorph actuators and the objective lens according to one embodiment of the application.
Figure 6B:
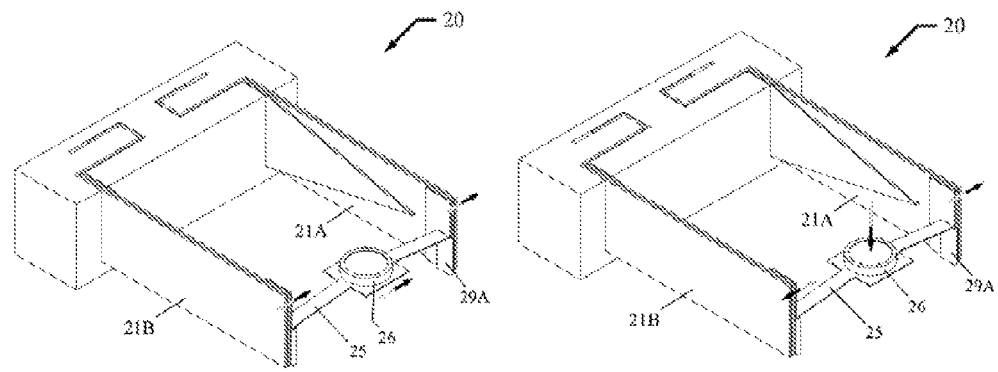

In particular, when the actuators 21A and 21B bend in the same direction, the lever beam 25 as well as the lens 26 thereon will be moved towards the tracking direction, as shown in FIG. 6A. When the actuators 21A and 21B bend in opposite directions, for instance, both of the actuators 21A and 21B move towards the lens 26, the lever beam 25 will be squeezed and then arched, which in turn lifts up the lens 26. While both of the actuators 21A and 21B move far away from the lens, the lever beam 25 will be extended, which in turn makes the lens move down, as shown in FIG. 6B. As discussed in the above, the "tracking" motion caused by the actuators 21A and 21B is referred to the secondary fine "tracking" motion, which co-acts with the first coarse "tracking" motion to keep the laser beams from the laser generator and photo-detector assembly 2042 (FIG. 3) aimed at the concentric spiral tracks of the disc. On the other hand, the lens 26 is moved in a vertical direction such that the laser beams from the laser generator and photo-detector assembly 2042 may be accurately transmitted to the disc with the strongest reflected signal from the disc. When the laser beams are reflected from the disc, they will reach a plurality of photodiodes (not shown) in the optical pickup system 204. The signals of reflected laser beams from each of photodiodes are added so as to form a focusing error signal. Only the focusing error signal is of zero, the focusing is accurate and the reflected signal will be the strongest one.

The damping layers 22A and 22B and the constraining layers 23A and 23B may extend along the lengthwise direction of the bimorph actuator 21A and 21B. The damping layers 22A and 22B are specially shaped in order to tackle a critical vibration mode arisen during the device 20 operates or the external shock impacts. As the bimorph actuators 21A and 21B swing to provide the "tracking" and "focusing" motions, they expand or contract one side of the damping layer while the constraining layer constrains the other side of the damping layer from moving. The relative motion between two sides of the damping layer generates a shear deformation to dissipate the vibration energy.

According to another embodiment, a hinge 54 is linked between the lever beam 25 and at least one of constraining layers 23A and 23B to adjust the stiffness of the pickup device and hold the lever beam 25 in the middle of the front ends of the bimorph actuators in the assembly, as shown in FIGS. 8A-8D. In another embodiment, the hinge 54 is connected to the at least one of constraining layers 23A and 23B. In the case that the lever beam 25 is attached to the bimorph actuator 21A and 21B by epoxy at the beam bases 29A and 29B, the hinge 54 may be provided between the constraining layers 23A and 23B and the lever bases 29A and 29B.

Figures 7A, 7B:
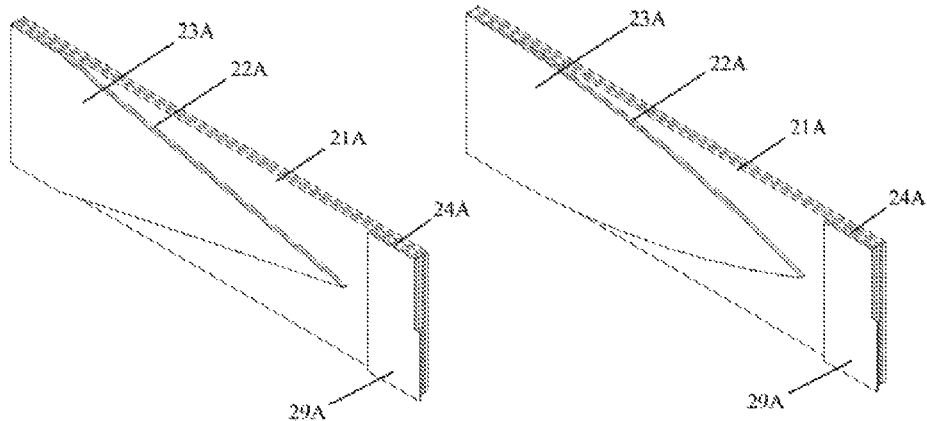
FIGS. 7A-7D illustrate different shapes of the constraining layer without a hinge according to different embodiments of the application.
Figures 7C, 7D:
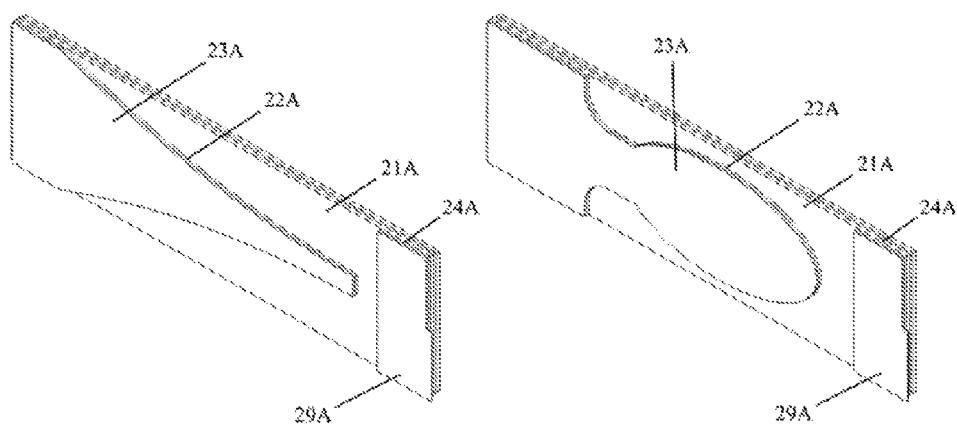
Figures 8A, 8B:
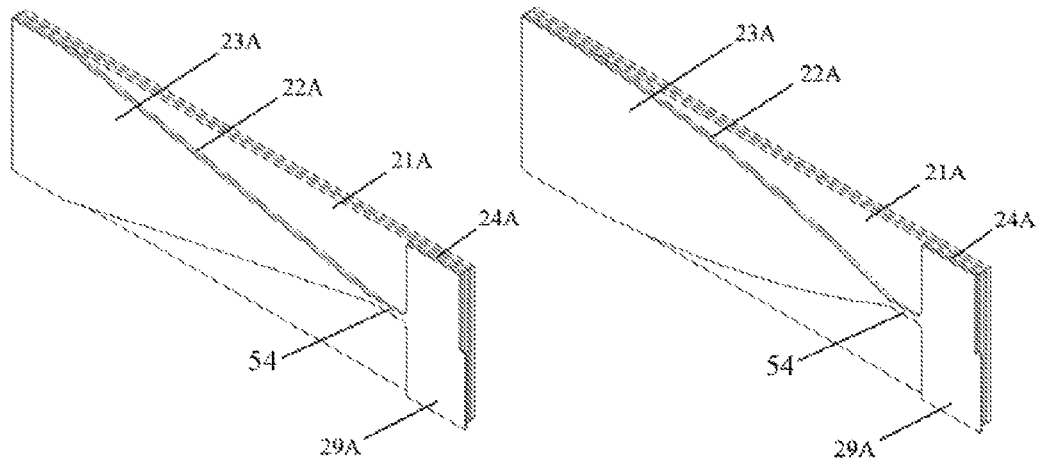
FIGS. 8A-8D illustrate different shapes of the constraining layer with a hinge according to different embodiments of the application.
Figures 8C, 8D:
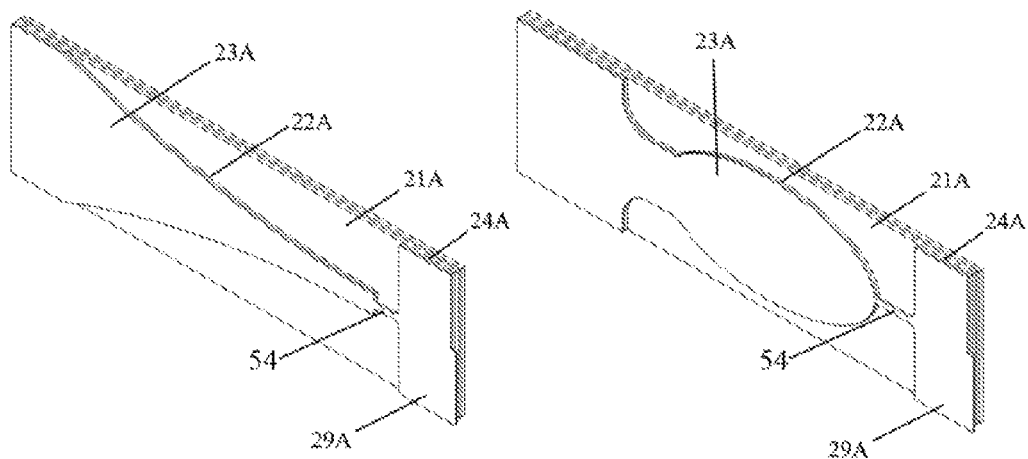

According to another embodiment of the optical pickup device 20, only one hinge 54 is provided between the lever beam 25 and one of constraining layers 23A and 23B, or between the lever beam 25 and both of constraining layers 23A and 23B. In this embodiment, each of the damping layers 22A and 22B and constraining layers 23A and 23B may be shaped with a triangular sheet, as shown in FIG. 7A. Alternatively, the damping layers 22A and 22B and constraining layers 23A and 23B may be shaped in different way. For example, each of the damping layers 22A and 22B and constraining layers 23A and 23B may be shaped as a curved triangular sheet as shown in FIG. 7B, a curved trapezoid sheet as shown in FIG. 7C, and an elliptic sheet as shown in FIG. 7D.

Figure 9:
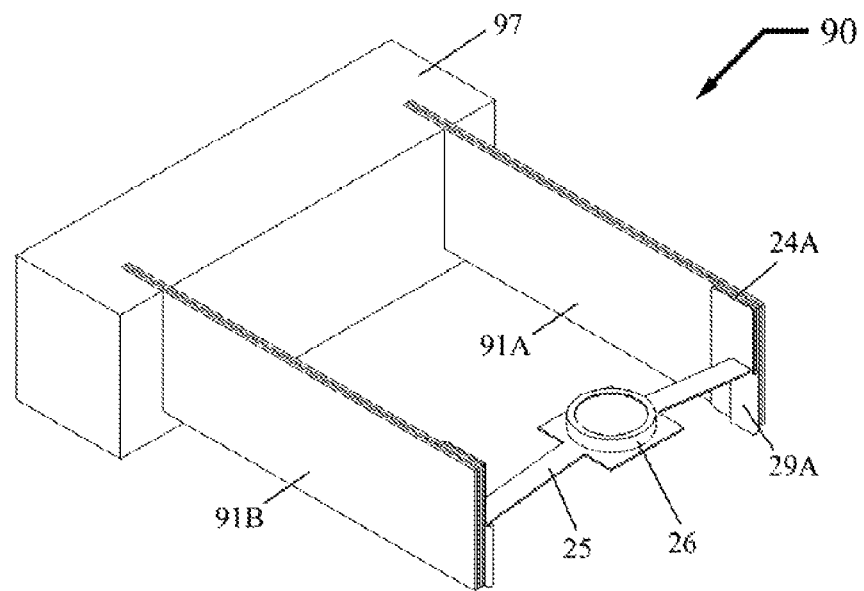
FIG. 9 illustrates a perspective view of a piezo-based optical pickup system according to another embodiment of the application.
Figure 10:
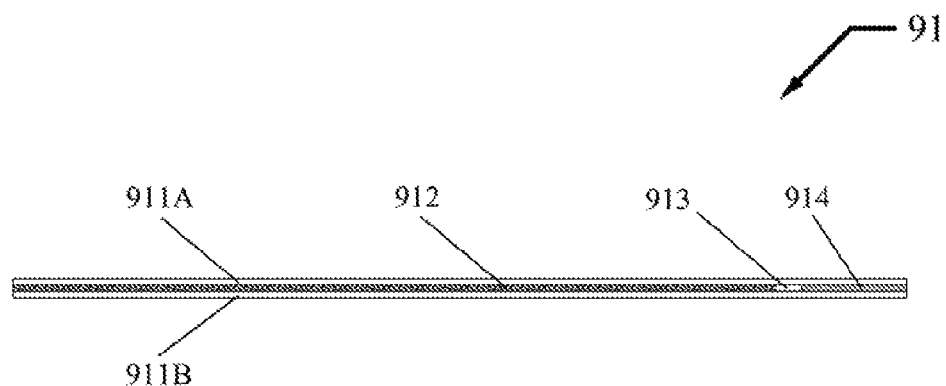
FIG. 10 is a cross-sectional view of the bimorph actuator according to one embodiment of the application as shown in FIG. 9.

FIG. 9 illustrates a piezo-based optical pickup device 90 according to one embodiment of the application. FIG. 10 is a cross-sectional view of the bimorph actuator as shown in FIG. 9. As shown, the optical pickup device 90 comprises two piezoelectric actuators 91A and 91B, each of which is inserted in a slot on the housing 97. The above mentioned lever beam 25 is provided between the two bimorph actuators 91A and 91B, and an objective lens 26 is arranged on the lever beam 25.

Each of bimorph actuators 91A and 91B has a first piezoelectric layer 911A and a second piezoelectric layer 911B, between which there are sandwiched a viscoelastic damping layer 912, and an epoxy layer 914 for increasing the transmissibility of active action of each bimorph actuator. Between the first piezoelectric layer 911A and the second piezoelectric layer 911B, the viscoelastic damping layer 912 and the conductive epoxy layer 914 form a separation 913 that is used as a reserving space for the shearing changes of the damping layer 912. The epoxy layer 914 is conductive and connects the opposite sides of the layers 911A and 911B.

Figure 11:
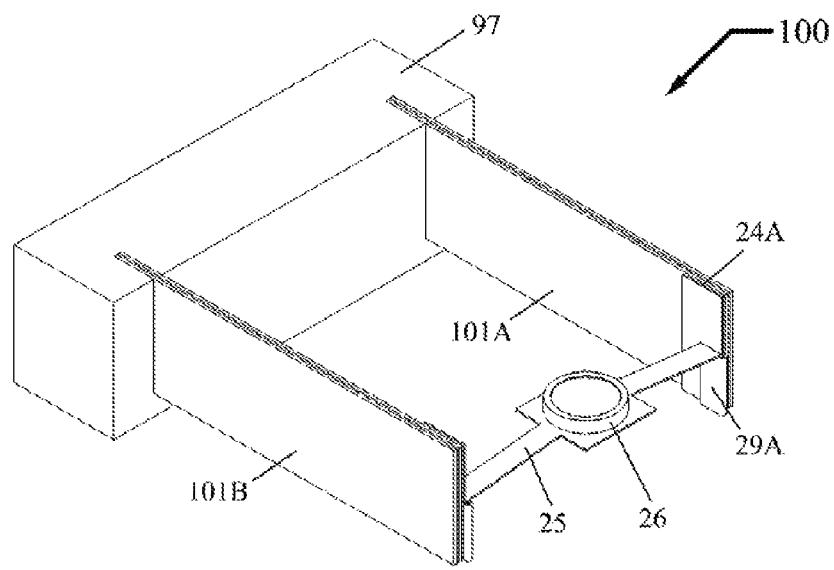
FIG. 11 illustrates a perspective view of a piezo-based optical pickup system according to another embodiment of the application.
Figure 12:
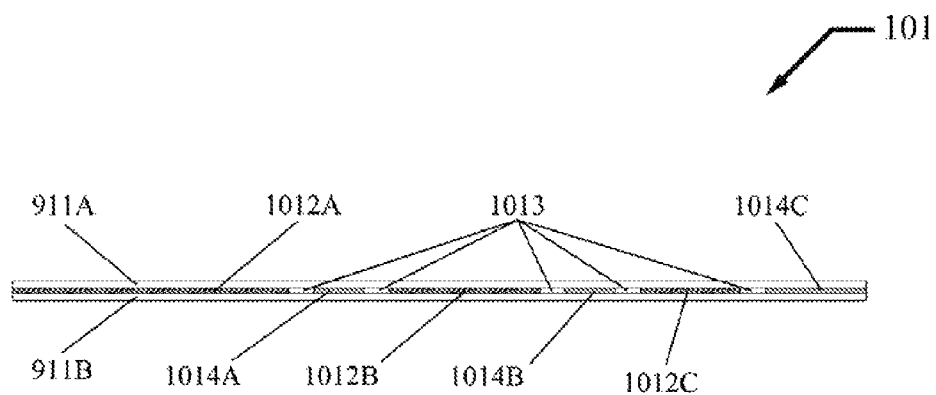
FIG. 12 is a cross-sectional view of the bimorph actuator according to one embodiment of the application as shown in FIG. 11.

Alternatively, as shown in FIGS. 11 and 12, a plurality of segment of viscoelastic damping layers 1012A, 1012B and 1012C and a plurality of segment of conductive epoxy layers 1014A, 1014B, 1014C may be alternately sandwiched between the first piezoelectric layer 911A and the second piezoelectric layer 911B, in which each viscoelastic damping layer and the conductive epoxy layer adjacent thereto form separations 1013 that are used as reserving spaces for the shearing changes of the respective damping layer 1012A, 1012B and 1012C.

According to this embodiment, the viscoelastic damping layers are used as a shim of the bimorph actuator to gain the damping effect. As the viscoelastic shimmed bimorph actuator swings to provide the tracking and focusing motions, one of the piezoelectric layers 911A and 911B expands one side of the viscoelastic layer while the other piezoelectric layer contracts the other side of the viscoelastic layer. The relative motion between two sides of the viscoelastic layer generates a shear deformation in the viscoelastic layer to dissipate the vibration energy in the pickup device.

The embodiments according to the application have been described in reference to the accompanying drawings, but the present invention is not limited thereto. Various modifications and changes can be made by those skilled in the art according to the disclosure herein, which should be within the scope of the present invention.

What is claimed is:

1. A pickup device assembly, comprising:
    a laser generator to generate laser beams;
    an objective lens;
    two piezoelectric actuators; and
    a damping layer arranged on one side of each of the two piezoelectric actuators,
    wherein once applied with voltages, the piezoelectric actuator generates bending moments to:
    move the objective lens in a horizontal direction such that the laser beams are focused by the objective lens and then aim at concentric spiral data tracks of a disc; and
    move the objective lens in a vertical direction such that the laser beams are accurately transmitted through the lens to the disc with a strongest reflected signal of the laser beams from the disc.

2. A pickup device assembly as claimed in claim 1, wherein each of the two piezoelectric actuators comprises:
    a piezoelectric layer; and
    a shim arranged on one side of the piezoelectric layer.

3. A pickup device assembly as claimed in claim 1, wherein each of the two piezoelectric actuators comprises at least two piezoelectric layers.

4. A pickup device assembly as claimed in claim 3, wherein a shim is sandwiched between the piezoelectric layers.

5. A pickup device assembly as claimed in claim 1, wherein there is provided a constraining layer on one side of the damping layer.

6. A pickup device assembly as claimed in claim 1, wherein a lever beam is arranged between the two actuators to support the objective lens.

7. A pickup device assembly as claimed in claim 6, wherein when the actuators bend in a same direction, the lever beam and the lens thereon will be moved in a horizontal direction; and
    when the actuators bend in opposite directions, the lever beam and the lens thereon will be moved in a vertical direction.

8. A pickup device assembly as claimed in claim 6, wherein a hinge is linked between the constraining layer and the lever beam.

9. A pickup device assembly as claimed in claim 5, wherein each of the constraining layer and the damping layer is shaped as a triangular sheet, a curved triangular sheet, a curved trapezoid sheet, or an elliptic sheet.

10. A pickup drive system, comprising:
    a laser generator for generating laser beams;
    an objective lens;
    at least one first actuator to provide the movement in tracking direction once applied with voltages to move the objective lens in a horizontal direction so as to implement a primary tracking motion, the at least one first actuator including a first piezoelectric actuator which comprises at least two piezoelectric layers;
    at least one second actuator to generate bending moments once applied with voltages to move the objective lens in a horizontal direction so as to implement a secondary tracking motion, the at least one second actuator including a second piezoelectric actuator which comprises at least two piezoelectric layers, wherein the primary tracking motion co-acts with the secondary tracking motion such that the laser beams are focused by the objective lens and then aim at concentric spiral data tracks of a disc; and
    a damping layer arranged on one side of each of the two actuators, and
    wherein the bending moments from the second actuator further make the objective lens move in a vertical direction such that the laser beams are accurately transmitted through the lens to the disc with a strongest reflected signal of the laser beams from the disc.

11. A system as claimed in claim 10, wherein the movement amount of the objective lens caused by the first actuator is more than that caused by the second actuator.

12. A system as claimed in claim 10, wherein each of the two piezoelectric actuators comprises:
    a shim arranged on one side of at least one of the respective the piezoelectric layers.

13. A system as claimed in claim 10, wherein a constraining layer is arranged on one side of the damping layer.

14. A system as claimed in claim 13, wherein a lever beam is arranged between the first actuator and the second actuator to support the objective lens.

15. A system as claimed in claim 14, wherein when the first and the second actuators bend in a same direction, the lever beam and the lens thereon will be moved in a horizontal direction; and
    when the first and the second actuators bend in opposite directions, the lever beam and the lens thereon will be moved in a vertical direction.

16. A system as claimed in claim 14, wherein a hinge is linked between the constraining layer and the lever beam.

17. A system as claimed in claim 13, wherein each of the constraining layer and the damping layer is shaped as a triangular sheet, a curved triangular sheet, a curved trapezoid sheet, or an elliptic sheet.

18. A system as claimed in claim 10, wherein the first actuator is arranged on one side of a pivot bearing and the objective lens is arranged on an opposite side of the pivot bearing,
wherein the first actuator operates once applied with voltages to make the objective lens move in the horizontal direction so as to implement the primary "tracking" motion.

19. A system as claimed in claim 18, wherein the second actuator is arranged on said other side of the pivot bearing.

20. A system as claimed in claim 18, wherein the first actuator comprises a VCM.

21. A system as claimed in claim 10, wherein there is provided a magnet adjacent to the first actuator, and
wherein the first actuator generates a magnetic field once applied with voltages, and the generated magnetic field co-acts with a magnetic field generated by the magnets to move the objective lens in the horizontal direction, so as to implement the primary tracking motion.

22. A system as claimed in claim 21, wherein the first actuator comprises a VCM.

23. An optical drive system, comprising:
two piezoelectric actuators;
a lever beam arranged between the two piezoelectric actuators;
an objective lens arranged on the lever beam;
wherein there is provided with a damping layer on one side of each of the piezoelectric actuators, and there is provided with a constraining layer on one side of the damping layer.

24. An optical drive system, comprising:
two piezoelectric actuators;
a lever beam arranged between the two piezoelectric actuators;
an objective lens arranged on the lever beam;
wherein each of the piezoelectric actuators comprises at least two piezoelectric layers, and
wherein at least one segment of damping layer and at least one segment of force transmission layer are alternately sandwiched between the piezoelectric layers.

* * * * *